United States Patent [19]

Johnson

[11] Patent Number: 4,523,519
[45] Date of Patent: Jun. 18, 1985

[54] HEATING AND COOLING SYSTEM USING GROUND AIR

[76] Inventor: Wilfred B. Johnson, 3289 Star Rte., Manistique, Mich. 49854

[21] Appl. No.: 528,853

[22] Filed: Sep. 2, 1983

[51] Int. Cl.³ .............................................. F24H 7/00
[52] U.S. Cl. ........................................ 98/31; 98/87; 98/88.1; 165/45
[58] Field of Search ...................... 98/29, 31, 32, 33 R, 98/35, 87, 88 R, 96; 165/45

[56] References Cited

U.S. PATENT DOCUMENTS

| | | | |
|---|---|---|---|
| 1,086,031 | 2/1914 | Davis | 98/31 X |
| 2,432,354 | 12/1947 | Temple | 98/31 X |
| 2,823,429 | 2/1958 | Grant | 98/87 X |
| 3,223,018 | 12/1965 | Tucker, Sr. | 98/43 X |
| 3,343,474 | 9/1967 | Sohda et al. | 98/31 |
| 3,982,475 | 9/1976 | Wild | 98/31 |
| 4,163,144 | 7/1979 | Reynier | 98/87 X |

FOREIGN PATENT DOCUMENTS

| | | | |
|---|---|---|---|
| 2514429 | 10/1976 | Fed. Rep. of Germany | 98/31 |
| 84944 | 5/1982 | Japan | 98/31 |

Primary Examiner—Harold Joyce
Attorney, Agent, or Firm—Harvey B. Jacobson

[57] ABSTRACT

A system by which ground air may be used to cool the interior of a house or other building when outside air temperature is high and warm a house or other building when the outside temperatures is low by using air at substantially ground temperature which is circulated through a duct system by gravity or thermal siphon flow without requiring the use of fans, electrical energy, elaborate controls and the like. The system includes a wall duct system communicated with a gable duct system and discharge at its upper end and an air inlet below ground level such as at the bottom of a basement. The system includes a duct system extending through doors and window assemblies in the external wall of the house or building with the wall duct system being substantially continuous throughout the area of the walls to preclude air migration through the walls.

7 Claims, 6 Drawing Figures

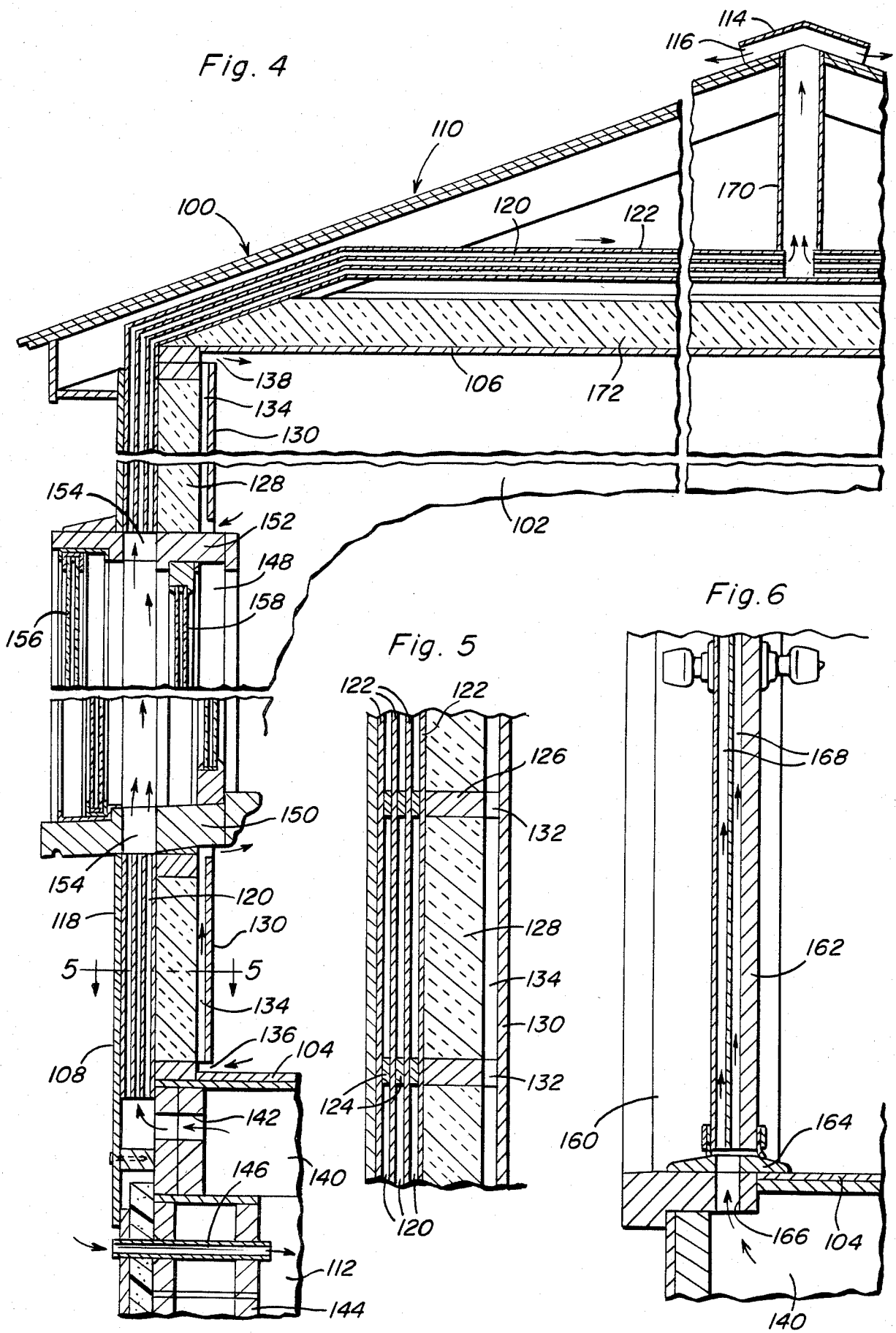

HEATING AND COOLING SYSTEM USING GROUND AIR

BACKGROUND OF THE INVENTION

1. Field of the Invention

The present invention generally relates to a system for utilizing air at substantially ground temperature for heating a building in winter and cooling a building in summer in a manner to reduce the use and cost of energy as compared to the use of conventional heating and cooling systems. The system of the present invention utilizes wall duct systems communicating a ground air inlet at the lower end of the duct system in a basement or the like with an outlet at the top of the building such as in the gable, along the ridge pole or the like so that gravity or thermal siphon flow of air will heat or cool the building.

2. Description of the Prior Art

The general concept of utilizing ground air to assist in heating or cooling a building is known and while such systems effect reduction in heating and cooling costs, certain of such systems have objections since the ground air utilized for heating or cooling is mixed with the air in the living space thus introducing questions regarding the purity of healthfulness of such air and, in some instances, requiring filters or other air treatment devices. The following U.S. patent relate to this field of endeavor but are not believed to be pertinent to the specific details of this invention:

U.S. Pat Nos. 1,974,244, Sept. 18, 1934; 2,119,038, May 31, 1938, 2,427,780, Sept. 23, 1947, 2,557,870, July 15, 1951; 2,793,509, May 28, 1957.

SUMMARY OF THE INVENTION

An object of the present invention is to provide a heating and cooling system for a house or other building utilizing ground air to provide at least some of the heat required in winter or provide some of the cooling effect required in summer in order to maintain the interior of the building at a temperature level comfortable to the occupants of the building.

Another object of the invention is to provide a heating and cooling system in accordance with the preceding object having an air intake below the first floor and below ground level and at outlet in the gable end or along the ridge of the roof to provide flow of air without the use of fans or other mechanical devices for circulating the air.

A further object of the invention is to provide a heating and cooling system in accordance with the preceding objects in which the walls of the building include continuous ducts forming a barrier to passage of air between the interior and exterior of the wall with the air passageways being continuous through window assemblies, door assemblies and the like so that substantially the complete periphery of the house or building structure includes an air passage to form, in effect, a curtain of ground air around the building which is isolated from the air interiorly of the building but yet helps to maintain the temperature of the interior of the building at a desired level.

Still another object of the invention is to provide a heating and cooling system for a building using ground air which is not mixed with the air interiorly of the building with vertical air passageways being incorporated into the peripheral wall and including insulation materials, vapor barriers, outside air inlet where needed and air discharge structure at the upper end portion of the air passageways to facilitate circulation of air without the use of fans and the like.

A still further object of the invention is to provide a heating and cooling system which will materially reduce the energy costs for heating or cooling any building which is substantially maintenance free, and will last as long as the building after installation and will occupy very little of the space enclosed by the building.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a fragmental sectional view illustrating another embodiment of the present invention.

FIG. 5 is a detailed sectional view illustrating the construction of the wall of this form of the invention.

FIG. 6 is a detailed sectional view illustrating a door structure with air passageways incorporated therein utilized in this invention.

DESCRIPTION OF THE PREFERRED EMBODIMENTS

Figure 1:
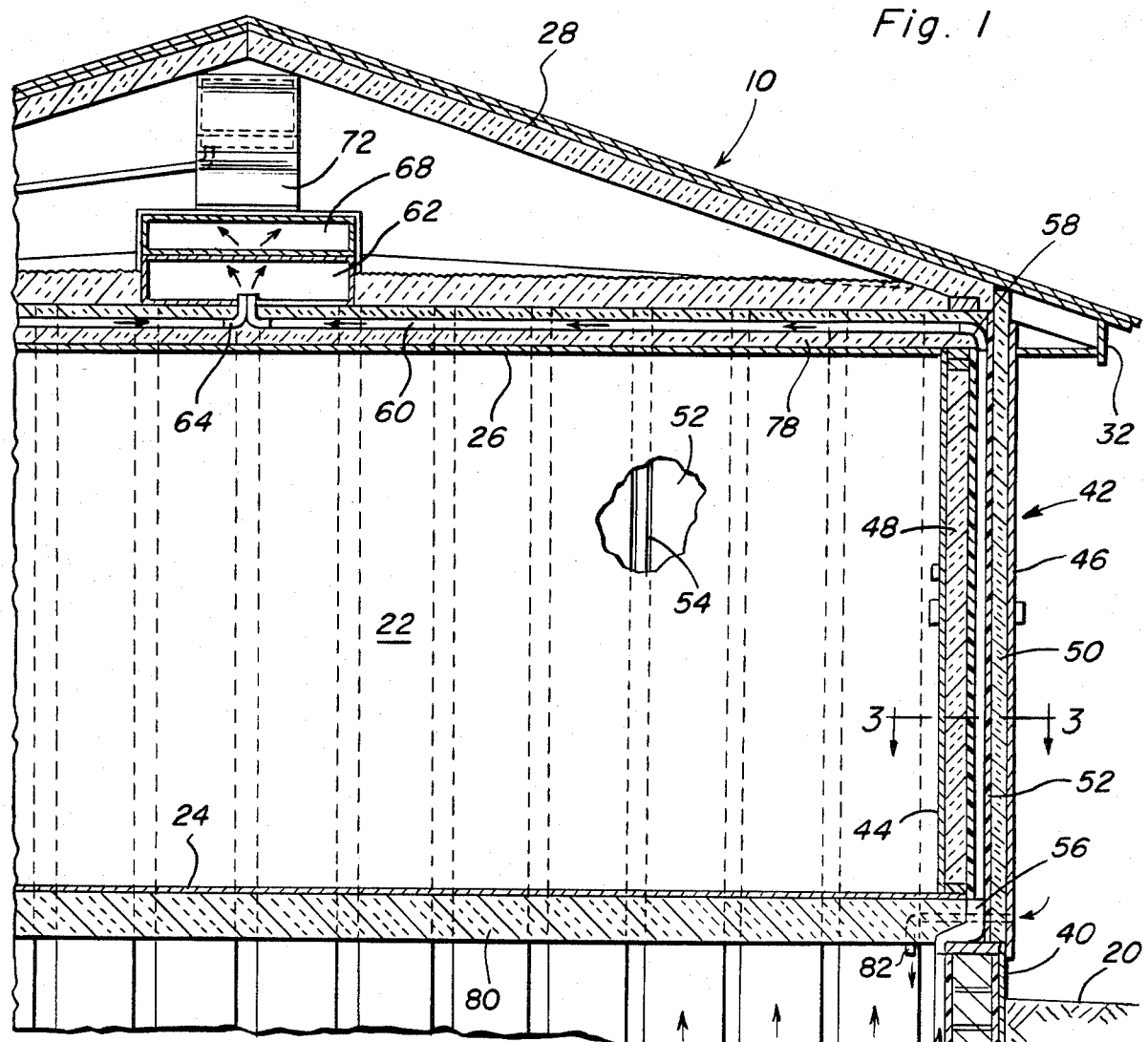
FIG. 1 is a sectional view of a house illustrating the heating and cooling system of the present invention installed therein.
Figure 3:
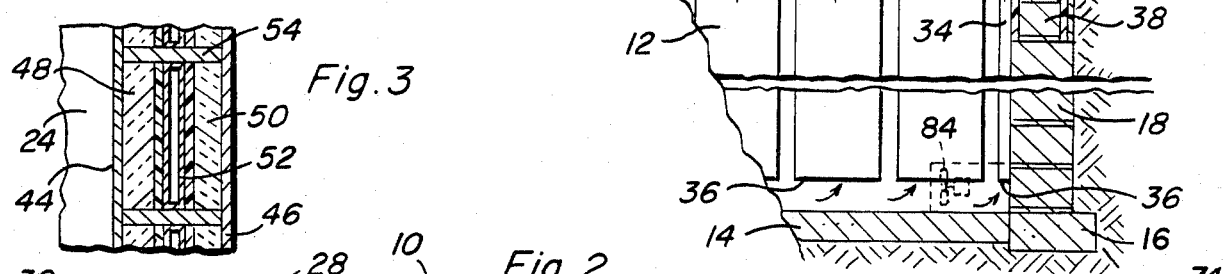
FIG. 3 is a fragmental detailed sectional view taken substantially upon a plane passing along section line 3—3 in FIG. 1 illustrating specific structural details of the wall structure and duct system.
Figure 2:
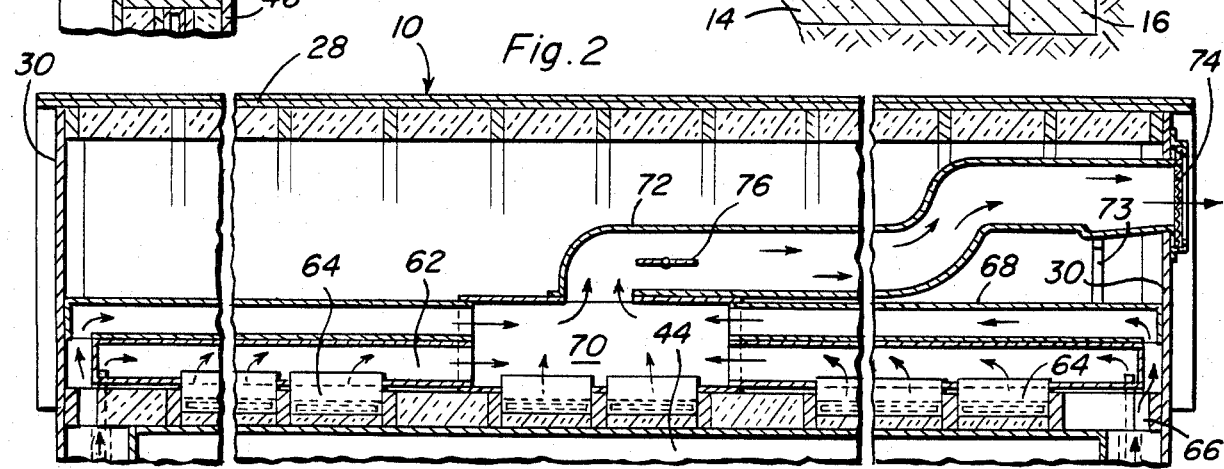
FIG. 2 is a longitudinal sectional view of the gable portion of the house in FIG. 1 illustrating the duct system associated with the vertical air passageways and the discharge from the gable end of the house.

Referring now specifically to the drawings, one embodiment of the heating and cooling system of the present invention is illustrated in FIGS. 1-3 in which the building or house in which the system is installed is generally designated by the reference numeral 10. The house 10 includes a basement 12 defined by a basement floor or concrete slab 14 with the usual footings 16 and a peripheral wall 18 below grade or below ground level 20. Above the basement 12 is a room or living space 22 which may be considered the first floor which is separated from the basement by the usual floor 24 and provided with the usual ceiling 26, roof structure 28, gable ends 30 and overhanging eaves 32 with the aforementioned structural components being conventional house or building structure. Along the interior of the peripheral wall 18 of the basement 12 is a plurality of air ducts 34 having an inlet 36 at the lower end thereof adjacent to but spaced above the floor or slab 14 as illustrated in FIG. 1 so that air may enter the lower ends of each of the ducts 34 and pass upwardly through the ducts 34 with it being pointed out that the ducts 34 form substantially a continuous air passage throughout the periphery of the basement. The basement wall 18 may be in the form of conventional hollow blocks filled with foam insulation 38 or any other conventional construction provided with an external waterproofing material, stone board 40 or the like. The insulation material 38 may be foam plastic or the like in the form of "Styrofoam". The peripheral wall 42 of the first floor space 22 includes an interior finish wall 44 and an exterior sheathing or finish wall 46 with the walls 44 and 46 having insulation 48 and 50 associated therewith and spaced apart to receive an air duct 52 vertically therethrough with the air duct being oriented between the studs 54 and completely filling this area to provide substantially a continuous vertical air passageway peripherally of the space forming the first floor 22. At the lower end of the ducts 52, the floor 24 is provided with a passageway 56 which communicates the air ducts 34 on the inner surface of the basement wall 18 with the air ducts 52 located centrally in the peripheral wall 42. The upper end of the air ducts 52 has an elbow 58 which communicates the air ducts 52 with horizontal air ducts 60 extending from each of the air ducts 52 along the side walls of the space 22 into a lower manifold or duct 62 with elbows 64 being provided between the ducts 60 and the duct 62. The vertical air ducts 52 on the end walls of the first floor space 22 are communicated through a passageway 66 with an upper air passageway or manifold 68 which discharges into a plenum 70 interconnecting the ducts 60 and 68 with the center of the plenum 70 communicating with an enlarged duct 72 extending to and through the gable end 30 and including a condensation trap and drain line 73 connected to a sewer or other disposal area. The duct 72 has a screen 74 provided in the discharge end thereof and a damper 76 is provided to control air flow through the duct 72 and out through the discharge screen 74 oriented below the apex of the roof 28 as illustrated in FIGS. 1 and 2.

The ducts 60 are provided with insulation 78 and the ducts 62, 68 and the associated plenum and duct 70 and 72 have insulation associated therewith which may be in the form of blown or poured insulation of fiberglass or the like. Also, the floor 24 may be provided with insulation material 80 for thermally insulating the first floor space 22 from the basement 12. Also, a fresh air inlet conduit 82 is provided through the wall 42 at its juncture with the wall 18 with the outer end communicating with the atmosphere and the inner end communicating with the basement 12 so that air may enter the fresh air inlet and pass into the basement to replace that air which flows upwardly through the air ducts 34, 52 and thus discharged from the duct 72.

As in good insulated house structures, the various external walls are insulated including the roof. While dimensions may vary, it has been found that an 8" wall is adequate for receiving air ducts which have a thickness of 1" and a width of 14" and may be constructed of metal or other material. The various insulation materials may be of desired thickness and FIG. 3 illustrates the association of the vertical air ducts 52 with the wall and insulation structure as well as the studs or vertical partition members 54. Also, FIG. 1 illustrates the optional use of a fan 84 associated with the lower ends of the ducts 34. If a fan is used, a manifold interconnecting the lower ends of the ducts 34 will be provided to facilitate rapid air circulation through the air ducts. However, it is preferable not to use a fan thereby eliminating the use of energy consuming devices and eliminating maintenance problems as well as control problems associated with electric fans and the like.

FIGS. 4-6 illustrate another embodiment of the invention incorporated into a house or building generally designated by numeral 100 which includes a first floor space 102 defined by a first floor 104, a ceiling 106 and a peripheral wall 108 with a roof 110 being provided and a basement space 112 all of which represents conventional house components with the roof 110 including a vented ridge structure 114 which includes longitudinally extending air discharge openings 116 immediately above the roof along each side of the ridge line. This type of ridge pole or ridge line vent roof is well known to ventilate the attic space of many buildings.

In this embodiment of the invention, the wall 108 includes an outer siding or sheathing 118 lined with a felt paper or the like, vapor barrier, foil or similar material with a plurality of air passageways 120 being provided between spaced foil backed paper 122 that is retained in spaced relation by wood lath members 124 as illustrated in FIG. 5 which are attached to vertical studs 126 so that the paper members 122 are retained in spaced relation to form continuous air passages 120. Suitable insulation material 128 is positioned in the wall 118 and the interior of the wall 118 is provided with gypsum wallboard or other finish material 130 also attached to the studs 126 by laths 132 thus forming an air space 134 which has an inlet slot 136 adjacent the floor 104 and an outlet slot 138 adjacent the ceiling 106. The first floor 104 includes the usual supporting joists 140 and an air passageway 142 is provided to communicate the basement space 112 with the lower ends of the air passageways 120. The basement space 112 is provided with the usual basement wall 144 of block construction or the like which may be insulated in any suitable manner and a return air inlet conduit 146 is provided through the basement wall above ground level for inlet of fresh air into the basement space 112 so that such air can pass upwardly through the air passageways 120.

In the wall structure 118 where a window occurs, a peripheral window frame 148 is installed in the wall including a windowsill 150 and header 152 each of which includes an opening 154 or a pair of slot like openings communicating with the air passageways 120 as illustrated in FIG. 4. The window frame 148 includes an outer window 156 and an inner window 158 which are spaced from each other and which may be in the form of a double hung window and storm window or any other conventional window construction so that air will pass upwardly through the openings 154 in the windowsill and window header respectively to provide a continuous air flow along the periphery of the wall 118 even where window assemblies are installed. In this construction, the interior finished wall terminates slightly below the windowsill 150 and slightly above the window header 152 to provide continuity of air circulation along the inner surface of finish wall 130.

FIG. 6 illustrates the structure where a door frame 160 is installed along with a swinging door 162 with the door sill 164 being mounted on the floor 104 in a conventional manner and provided with an air passageway 166 which communicates with the space between the floor joists 140 and thus the basement space 112. The door 162 includes a plurality of vertical air passages or ducts 168 extending upwardly therethrough for alignment with a corresponding opening in a door frame header to provide continuity of air passageways in the wall where door assemblies are inserted in the wall.

The vertical air passageways 120 and the paper members 122 which define those passageways are continuous between the junction between the roof and ceiling with the passageways and paper members extending inwardly and communicating with a vertical vent tube or pipe 170 which communicates the air passageways 120 with the ridge vent openings 116. The ceiling 106 is insulated as at 172 and likewise, the basement wall may be insulated and the wall structure insulated as described heretofore. In this structure, the air passageways 120 may be formed by paper components spaced apart by wood laths or the like or the passageways may be formed by sheet metal panels spaced apart and supported in any suitable manner.

With the present invention installed in a building, considerable energy saving may be realized in heating or cooling the building. Assuming that it is desired to maintain the building at 72° F. and ground temperature is approximately 46° F., by circulating air through the air passageways which is approximately 46° F., it is only necessary to heat the interior air from approximately 46° F. to 72° F. Even if the outside air temperature is 10° F., the ground air temperature passing through the air passageways will maintain the interior temperature at approximately 46° F., thus requiring only that sufficient energy be utilized to elevate the temperature from 46° F. to 72° F. rather than from 10° F. to 72° F. Likewise, circulating 46° F. air through the passageways in the summer will maintain the interior of the building at a comfortable temperature level. The air passageways between inner and outer insulated walls produces an upward draft or chimney effect to move the air vertically through the air passageways for discharge through the air discharge outlet in the gable end wall or through the ridge vent in the roof. Such air flow is substantially noiseless and does not include any moving parts and thus is maintenance free after installation. Also, the installation of the air passageways occupies very little of the usable living space as compared to heating and air conditioning ducts normally provided with high velocity systems employing a fan. If installed in new construction, the intake may be communicated with ducts disposed below the basement floor or concrete slab which have an inlet communicated with the interior of the basement or to atmosphere to enable circulation of air through the air passageways without mixing the ground air with the air in the interior of the building. In some instances, heat may be utilized from other natural sources such as sewage digestion in a septic tank or decaying vegetable matter in a compost pile or the like. Also, in some installations, a "Styrofoam" panel may be inserted in the ground just outside of the wall and a slanted panel of plywood or the like may extend from the ground to an air passageway between the external sheathing and the insulation to provide circulation of ground air through the exterior of the wall which is in addition to circulation of air through the interior of the wall. If desired, various types of controls may be employed to close off or open air passageways in certain areas or walls of a building depending upon the air temperature conditions. For example, it may be desirable to enable circulation through a wall having a sun exposure whereas a wall not having sun exposure may be closed off if desired. Also, the heating and cooling system of the present invention may be incorporated into various types of storage buildings or buildings that do not have a basement but only a crawl space utilizing the same principles as disclosed in both embodiments of this invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A heating and cooling system for buildings comprising a building structure having a peripheral wall, a roof and below ground enclosed basement space, an enclosed space above the basement space, a floor separating the basement space from the enclosed space above the basement space, said peripheral wall including a plurality of vertical air ducts in communication with the basement space, said air ducts in the peripheral wall terminating in inwardly extending air ducts below the roof communicating with a discharge adjacent the roof to provide flow of air between the basement space and the discharge adjacent the roof for vertical flow of air through the walls of the enclosed space above the basement space, said vertical air ducts covering substantially the entire peripheral wall of the enclosed space above the basement space to heat or cool the peripheral wall and the enclosed space above the basement space and prevent migration of ambient air between the outer and inner surfaces of the wall, the inner surface of said wall including means providing a vertical air passage between a point adjacent the floor and a point spaced substantially above the floor, said air ducts in the peripheral wall each including a plurality of spaced sheets defining a plurality of thin vertical air passages extending throughout the peripheral wall and inwardly to the air discharge adjacent the roof.

2. The system as defined in claim 1 wherein said air discharge includes a ridge vent at the apex of the roof with the ridge vent being communicated with the air ducts.

3. The system as defined in claim 2 wherein said peripheral wall includes a window assembly, said window assembly including inner and outer windows, a window header and a windowsill with the header and sill including air passageway means in communication with the air ducts for vertical air flow through the window.

4. The system as defined in claim 3 wherein the peripheral wall includes a door and door frame with the door including vertical passageways and a threshold and header of the door frame including passageways communicating with the air ducts in the wall to enable vertical air flow through the door.

5. The system as defined in claim 4 wherein said peripheral wall includes an outside air inlet communicating with the basement space with a plurality of such air inlets being provided peripherally of the wall.

6. The system as defined in claim 5 wherein the wall includes an insulated basement wall for the enclosed basement space and air ducts in the basement space forming air passageways communicating the floor of the basement space with the air ducts in the wall.

7. The system as defined in claim 5 wherein said wall includes insulation between the innermost of said sheet members, said means providing a vertical air passage comprising an interior finish wallboard spaced from said insulation to form an air passage, the lower end of said wallboard being positioned adjacent to but spaced above the floor to communicate the air passage with the enclosed space above the basement space, an upper edge portion of said wallboard being spaced below a horizontal member substantially above the floor and communicating the air passage with the enclosed space above the basement space.

* * * * *